United States Patent
Kaburlasos et al.

(10) Patent No.: US 8,924,756 B2
(45) Date of Patent: Dec. 30, 2014

(54) PROCESSOR CORE WITH HIGHER PERFORMANCE BURST OPERATION WITH LOWER POWER DISSIPATION SUSTAINED WORKLOAD MODE

(75) Inventors: Nikos Kaburlasos, Lincoln, CA (US); Eric C. Samson, Folsom, CA (US); David Puffer, Tempe, AZ (US); Lakshminarayan Jagannathan, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 657 days.

(21) Appl. No.: 13/169,182

(22) Filed: Jun. 27, 2011

(65) Prior Publication Data

US 2012/0331321 A1    Dec. 27, 2012

(51) Int. Cl.
G06F 1/32    (2006.01)
G06F 1/26    (2006.01)
G06F 1/00    (2006.01)
G06T 1/00    (2006.01)
G09G 5/36    (2006.01)

(52) U.S. Cl.
CPC .............. *G06F 1/324* (2013.01); *G06F 1/3228* (2013.01); *G06F 1/3287* (2013.01); *G06F 1/3296* (2013.01); *G09G 5/363* (2013.01); *G09G 2330/021* (2013.01); *G09G 2360/08* (2013.01)
USPC ............ 713/323; 713/300; 713/320; 345/418

(58) Field of Classification Search
None
See application file for complete search history.

(56) References Cited

U.S. PATENT DOCUMENTS

| | | | |
|---|---|---|---|
| 5,948,105 A * | 9/1999 | Skurnik et al. | 713/323 |
| 7,069,463 B2 * | 6/2006 | Oh | 713/503 |
| 7,409,570 B2 | 8/2008 | Suzuoki | |
| 7,610,497 B2 | 10/2009 | Lin | |
| 7,783,905 B2 | 8/2010 | Chang | |
| 8,271,812 B2 | 9/2012 | de Cesare | |
| 8,347,119 B2 | 1/2013 | Song | |
| 2001/0014006 A1 * | 8/2001 | Kim et al. | 361/683 |
| 2002/0116650 A1 * | 8/2002 | Halepete et al. | 713/300 |
| 2006/0156047 A1 * | 7/2006 | Ito et al. | 713/310 |
| 2007/0011475 A1 * | 1/2007 | Berkes et al. | 713/300 |
| 2010/0146311 A1 * | 6/2010 | Jahagirdar et al. | 713/300 |
| 2011/0022868 A1 * | 1/2011 | Harchol-Balter et al. | 713/323 |

OTHER PUBLICATIONS

PCT International Search Report and Written Opinion issued in corresponding PCT/US2012/043938 dated Jan. 14, 2013 (10 pages).
Taiwanese Search Report of Taiwanese patent application No. 101122799 dated May 7, 2014 (1 page).

* cited by examiner

*Primary Examiner* — Ji H Bae
(74) *Attorney, Agent, or Firm* — Trop, Pruner & Hu, P.C.

(57) ABSTRACT

A processor may operate at a first frequency level for a first time interval. The processor automatically may transition to a sleep state from the first frequency level after the first time interval. Then the processor automatically transitions from the sleep state to the first frequency level after a second time interval. As a result the processor may operate at a reduced power consumption and higher performance.

26 Claims, 4 Drawing Sheets

PROCESSOR CORE WITH HIGHER PERFORMANCE BURST OPERATION WITH LOWER POWER DISSIPATION SUSTAINED WORKLOAD MODE

BACKGROUND

This relates generally to processors.

Some processor cores provide limited performance because of limited power consumption budgets. This is especially true for processor cores for battery operated products.

Higher performance may be achieved in a burst mode operation involving a burst of high frequency activity that lasts for a few seconds or milliseconds. During such burst mode operation, continued higher performance operation for extended time periods would cause the core to exceed its sustained power budget. A sustained power budget specifies the amount of power, on average, that the processor should consume over time in order to meet a sustained power budget.

Burst mode performance may be important in achieving a quick response time, for example, in interactive graphics applications and may require that the graphics core operate at a higher frequency and dissipate power in excess of that permitted by its sustained power budget. Thus, the desire for higher burst mode performance may be inconsistent with achieving low power consumption. Higher performance is generally achieved by more execution units that generally lead to greater leakage power consumption, making it difficult to stay within a sustained workload power consumption budget.

DETAILED DESCRIPTION

In accordance with some embodiments of the present invention, a higher performance, limited duration, burst mode operation may be enabled even though that burst mode would result if continued long enough, in consuming more power than a sustained power budget would permit. The burst mode operation may be compensated for by a sleep or powered down mode wherein leakage power consumption is substantially reduced, if not completely eliminated. In some embodiments, a core may cycle in regular intervals between a higher performance burst mode and sleep mode, the sleep mode resulting in reduced leakage power consumption that enables the system to operate at frequencies higher than those permitted by the sustained power budget for a short period of time and still overall meet the sustained power budget.

The core may be any processor core, including a graphics core, a central processing unit core, or a microcontroller core. The core may dissipate significant leakage power consumption relative to its sustained power budget in some embodiments.

By spending additional time in the sleep state, the core reduces the average leakage that it dissipates over time. The frequency of operation of the core when it is not in the sleep state may then be higher than its sustained power budget would permit. For example the burst mode frequency may be the maximum frequency of operation at the minimum functional voltage called Vmin. If the core were to operate at a frequency higher than the maximum frequency of operation at Vmin, then it would have to operate at a voltage higher than Vmin and then it would dissipate even higher power. In this regard it should be noted that dynamic power, as well as leakage, increases exponentially with voltage.

Figure 1:
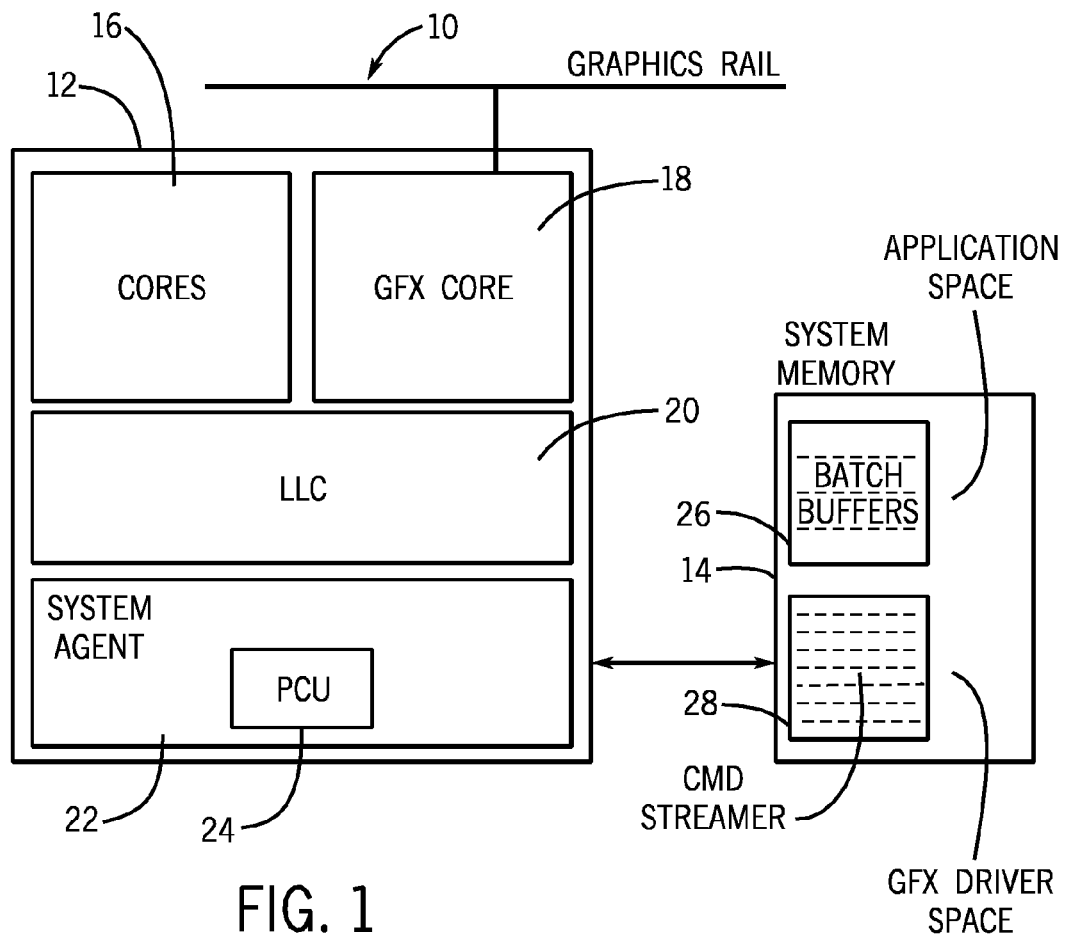
FIG. 1 is a schematic depiction of one embodiment of the present invention.

Referring to FIG. 1, in accordance with one embodiment of the present invention, a system 10 may include an integrated circuit 12 which, in one embodiment, includes a plurality of processor cores 16. In some embodiments, the system 10 is battery powered for example, a battery powered system 10 may be a laptop computer, a tablet, a smartphone, or a mobile Internet device. In some cases, only one core may be included, but, in other cases, two, four or more cores may be included. In addition, in one embodiment, integrated on the same integrated circuit 12, may be a graphics controller core 18. However, in other embodiments, the graphics controller core may be eliminated or may be a separate integrated circuit. Also, on the same integrated circuit 12 may be a last level cache (LLC) which, in one embodiment, may be a shared level three (L3) cache 20.

A system agent 22 may include all of the external interface controllers, in one embodiment, including Peripheral Component Interconnect (PCI) Express (See PCI Express 2.0 Specification, 15 Jan. 2007, available from the PCI-SIG, Beaverton Oreg. 97006), Direct Media Interface (DMI), memory, and display interface controllers. The system agent 22 may include a power control unit (PCU) 24 which, in one embodiment, is a programmable microcontroller that collects information about temperature and current and can control voltage and frequency interactively of any cores on the integrated circuit 12.

In one embodiment, the PCU 24 may implement a higher frequency, higher performance mode. It may also implement power sharing between the cores, including the graphics core 18, in some embodiments. For example, it may use power saved in a sleep mode to enable higher than sustained level frequency operation for a limited period of time.

Coupled to the integrated circuit 12 is a system memory 14. In the application space of a system memory 14 may be batch buffers (BBs) 26 which are basically execution units. In the graphics driver space of the system memory 14 may be a command streamer 28.

In the following description, an embodiment implemented in connection with a graphics controller is described. However, the present invention may be applicable to many different types of cores and is not in any way limited particularly to implementation as a graphics controller.

In some embodiments, a sustained power budget may be achieved, while enabling higher performance operation by using duty cycled operation. This duty cycled operation is particularly well suited to situations in which a relatively large core must operate within a relatively low power budget and, particularly, in situations where the core is likely to operate deep within its frequency scaled region. The frequency scaled region is a region of operational frequencies where frequency can be raised without having to also increase operating voltage.

When the core processes a sustained workload, it operates at a higher, more efficient, frequency and power dissipation than its sustained power budget would allow. As a result, it can process the workload quickly and allow itself to go into a sleep state for a period of time before it repeats the cycle. In one embodiment, the sleep state may be the C6 state, wherein only a small cache is still enabled with the core's architectural state saved before power down. Then, on average, the core still operates within its sustained power budget over time.

Figure 2:
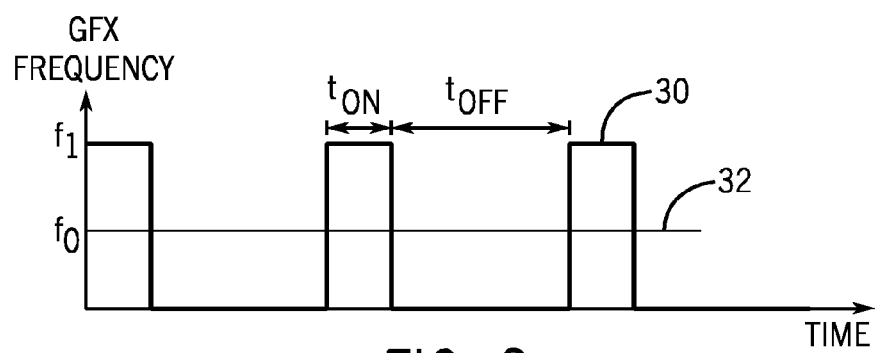
FIG. 2 is a graph of frequency versus time for one hypothetical embodiment of the present invention.

For example, referring to FIG. 2, the conventional sustained frequency $f_0$ 32 refers to the conventional core operation where the core operates at a certain frequency which remains steady for some period of time and which is determined by the allowable power budget at the time. Note that while this power budget may change, the power budget may be specified in some embodiments at any particular point in time. In duty cycled operation 30, the core, such as a graphics core, operates at a higher frequency $f_1$ for a short interval of time, indicated as $t_{on}$, and then powers down for a period of time $t_{off}$ and the cycle repeats. The on and off times need not be the same in every cycle and they may be varied.

The duty cycled operation can be made completely transparent to software. An application submits frames to a driver and the driver fills up the command streamer with kernels to be executed on the execution units. The power control unit then decides when to power down or up the core in a way that may be transparent to software in some embodiments.

When the power control unit determines that it is time for the core to power down as part of the duty cycled operation, it may send a message asking the core to power down. This message blocks the command streamer from submitting more work or kernels to the core in one embodiment. However, work already in progress within the core's pipeline may be allowed to complete in some embodiments.

Then, when pending work has been completed, the core saves its context to a cache and powers down, without letting the driver know that it has completed executing the previously submitted kernels. From a software perspective then, these kernels are still in execution. When the power control unit later decides that it is time for the core to wake up, it sends a message to the core to wake it up again. When the core wakes up, one of the first things it may do may include restoring context and signaling the driver about the completion of the kernels it finished executing just before it went to sleep. In this way, the driver is not able to tell the difference between the conventional operation and the duty cycled operation of the core, in some embodiments.

The optimal frequency $f_1$ of operating during the duty cycled mode can be determined. It is the maximum frequency that can be supported at the minimum voltage of operation $V_{min}$. The following table shows the voltage (V) frequency (Freq. in gigaHertz) pairs, as well as the power dissipation (i.e. Dynamic power consumption plus Leakage power consumption ("Lkg power") equals Total power consumption in Watts) for an example tablet graphics core on a low leakage process to illustrate one embodiment of a method to set the frequency $f_1$.

| Freq | V | Dynamic power | Lkg power | Total power |
|---|---|---|---|---|
| 0.10 | 0.675 | 0.42 | 0.84 | 1.26 |
| 0.15 | 0.675 | 0.64 | 0.84 | 1.48 |
| 0.20 | 0.675 | 0.85 | 0.85 | 1.70 |
| 0.25 | 0.675 | 1.07 | 0.85 | 1.92 |
| 0.30 | 0.675 | 1.29 | 0.86 | 2.15 |
| 0.35 | 0.675 | 1.49 | 0.85 | 2.34 |
| 0.40 | 0.675 | 1.71 | 0.85 | 2.56 |
| 0.45 | 0.675 | 1.93 | 0.85 | 2.79 |
| 0.50 | 0.675 | 2.16 | 0.86 | 3.01 |
| 0.55 | 0.675 | 2.41 | 0.88 | 3.29 |
| 0.60 | 0.718 | 2.89 | 0.99 | 3.88 |
| 0.65 | 0.751 | 3.42 | 1.11 | 4.53 |
| 0.70 | 0.787 | 4.05 | 1.26 | 5.31 |
| 0.75 | 0.829 | 4.80 | 1.46 | 6.26 |
| 0.80 | 0.869 | 5.63 | 1.67 | 7.30 |
| 0.85 | 0.918 | 6.67 | 1.98 | 8.65 |
| 0.90 | 0.966 | 7.82 | 2.34 | 10.15 |
| 0.95 | 1.023 | 9.23 | 2.84 | 12.07 |
| 0.95 | 1.023 | 9.23 | 2.84 | 12.07 |

The workload can be assumed to be the GLBenchmark workload (available from Kishonti Informatics) for example. In this example, the target sustained power budget is 1.5 Watts. Given a leakage, at $V_{min}$ equal to 0.675 volts, of about 0.85 Watts, a frequency of about 0.15 gigaHertz can be fit into a 1.5 Watt power budget. This frequency may be much lower than the maximum $V_{min}$ frequency of 0.55 gigaHertz and too small to achieve acceptable performance within a 1.5 Watt budget. However, if the core operates at the maximum $V_{min}$ frequency of 0.55 gigaHertz and with a duty cycle of about 46 percent, then its average dynamic power would be 1.1 Watts (dynamic power at 0.55 gigaHertz times 46 percent equals to 2.41 Watts times 46 percent). Its average leakage power would be 0.4 Watts and its average total power would be 1.5 Watts, which is within its budget in this illustration.

The resulting performance increase, compared to the steady state operation at 0.15 gigaHertz, is 1.68×, providing a 68 percent increase in performance with the same average power budget. This can be achieved due to the fact that the leakage power is gated off for 54 percent of the time in this example, leaving room for additional frequency and performance on average.

The core may be duty cycled at a frequency lower or higher than the maximum frequency that can be supported at $V_{min}$. However, at lower frequencies, performance would be lower due to lower frequency use and the larger leakage power dissipation that would leave less room for dynamic power. At higher frequencies, the core operates outside the frequency scaled region, which means that voltage would have to be raised. However, when voltage increases, both dynamic and leakage power consumption increase exponentially. To keep the average power within the power consumption budget would require the use of a very small duty cycle operation and, as a result, the average performance, which is proportional to the frequency and the duty cycle of operation, decreases. So, the maximum frequency that can be supported at $V_{min}$ is generally the optimal frequency for duty cycled operation.

There are many ways to control the duty cycle of a graphics core operation. One way is to count time in order to enforce the target duty cycle. The design may assume a predetermined worst case graphics workload, such as the GLBenchmark (available from Kishonti Informatics) or 3DMark06 benchmark set to test the performance of a graphics core (available from Futuremark Corp.) and set a frequency of operation in the burst mode based on that case. The target duty cycle then is the ratio of the sustained mode frequency of operation (i.e. the frequency of operation that would have been used absent duty-cycling) over the maximum frequency that can be supported at the minimum voltage of operation (0.55 gigaHertz in the example).

As another example, especially in a turbo mode embodiment, the duty cycle may be controlled based on the current energy margin. The turbo mode allows the graphics core power budget to change dynamically over time. For example, suppose that at a certain point in time the turbo mode algorithm has determined that the graphics core needs to stay within a 1.5 Watt power budget on average, assuming for simplicity that this is a dynamic power budget, and ignoring leakage power consumption. Then, within a period of 100 milliseconds, the graphics core would have to consume no more than 1.5 Watts×0.1 second or 0.15 Joules. The graphics core would count 0.15 Joules of energy credits while it operates. Activity counters in the core can be used to help measure energy consumption in one embodiment. When these energy credits have been consumed, then the core may have to power down until the 100 millisecond window expires. In this way, the graphics core need not exceed its average power budget within the time window.

Graphics core duty cycled operation can exist within the overall context of graphics core turbo modes. A higher graphics turbo mode budget usually allows the graphics core to operate at a higher frequency.

Figure 3:
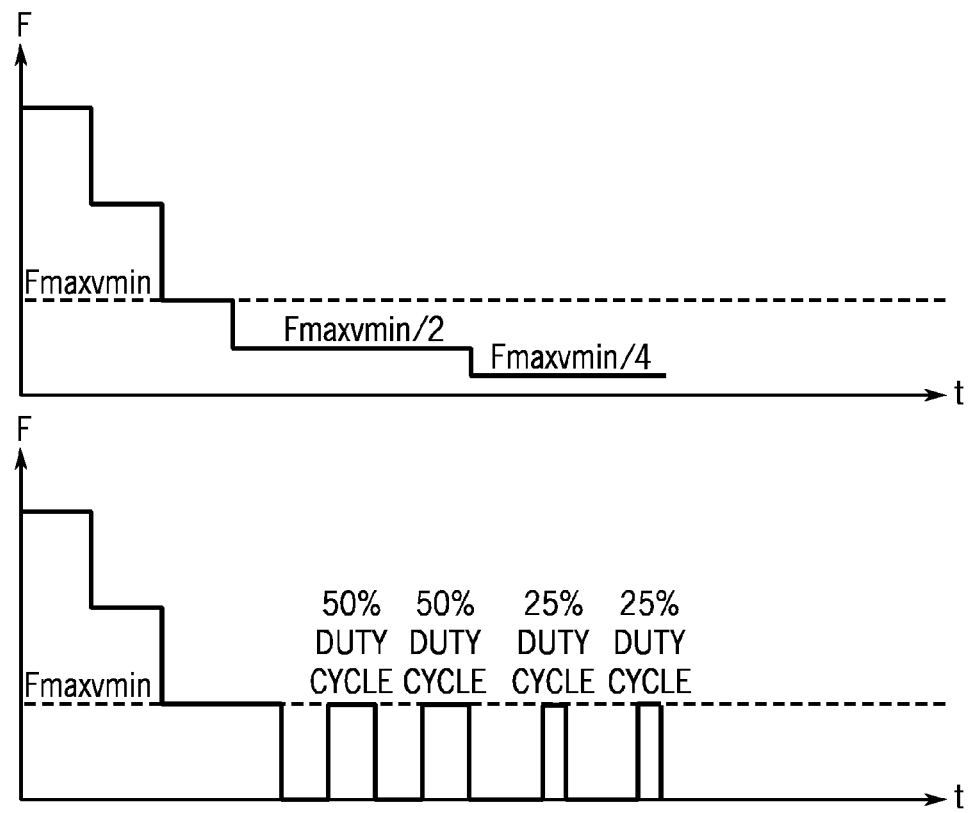
FIG. 3 includes graphs of frequency versus time for another hypothetical embodiment of the present invention.

Thus, in the upper graph of FIG. 3, a graphics turbo mode operation is shown wherein the graphics power budget gradually decreases over time, which forces the graphics frequency to also go down, for example, to levels lower than the maximum frequency that can be supported at $V_{min}$, indicated as $F_{maxvmin}$. When duty cycled operation is supported by the graphics core, as shown in the lower graph, then, whenever the core would have been forced to function at a frequency that is lower than the maximum $V_{min}$ frequency, then the graphics core, instead, operates at the maximum $V_{min}$ frequency, but in a duty cycled fashion.

The duty cycle may be determined by the graphics turbo power budget. A lower power budget would normally push the core to a lower frequency of operation, if duty-cycled operation were not supported, but, instead, it will enforce a shorter duty cycle on the graphics core operation, if duty cycled operation is supported.

In some embodiments, the graphics core context is stored every time the graphics core powers down and may be restored when the core powers back up again. This implies that the period of duty cycled operation not be so short that the graphics core dissipates more power saving in restoring context than it would save in leakage due to powering down periodically. The graphics core should not be system memory limited when operating at the maximum $V_{min}$ frequency since, otherwise, operating at that frequency, instead of at a lower frequency, in the frequency scaled region may not provide the expected performance benefit.

Platform thermals may be designed such that the graphics core does not reach the maximum temperature trip point and is not subjected to thermal throttling while in its duty cycled operation. Otherwise, the core may not achieve the expected performance benefit in some cases. Also, the voltage regulator may supply the core with the current it needs when it operates in the maximum $V_{min}$ frequency. The granularity at which the software processes the graphics workload may also allow the graphics core to power down very soon after the energy credits have been exhausted.

Graphics frames are usually processed by a number of batch buffers submitted by the application. The batch buffers are broken down into commands that the graphics driver places in the command streamer. These commands are passed to the hardware for execution. A batch buffer may vary in duration from a few microseconds to a few milliseconds.

When the graphics core exhausts its power down derived energy credits, it saves context and powers down as soon as possible. Ideally, the graphics core completes the workload which has already been scheduled for execution in the command streamer before powering down. If the workload is submitted to the command buffers on a batch buffer boundary, it may take up to several milliseconds for the graphics core to power down, which may not be acceptable since it may prevent achieving the target duty cycle operation. Thus, the hardware and the driver may be able to support the workload scheduling on a finer draw-call or object boundary in some embodiments. When the command streamer receives a message that it is time to power down, it may not be allowed to schedule any more objects for processing in the render engine in some embodiments. The objects currently executing complete execution within no more than a few microseconds, at which point the graphics core may be allowed to save context and power down.

Figure 4:
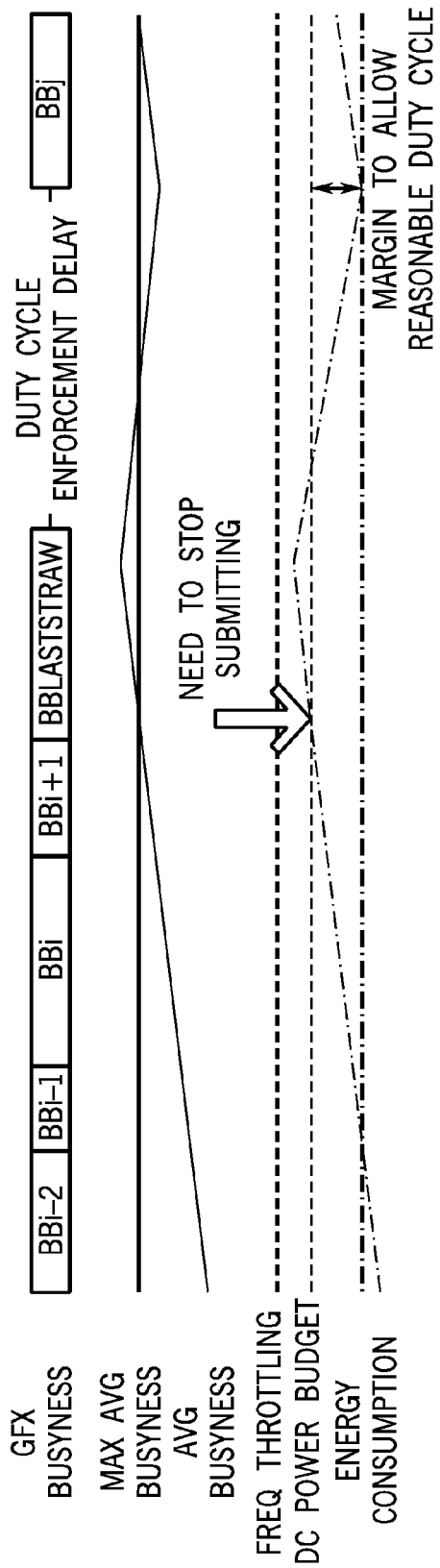
FIG. 4 is a graph showing energy consumption of a hypothetical embodiment of the present invention.

Referring to FIG. 4, the workload submitted at the graphics engine on a batch buffer (i.e. BBi–2 . . . BBj) boundary is illustrated. Finer control of duty cycle can be achieved if the graphics work is submitted with draw-call or object resolution. Graphics energy consumption increases or decreases over time, when the graphics engine is active or idling, respectively, but averages around the target DC power budget, indicated in FIG. 4. The frequency of operation may be set to be the maximum frequency that can be supported at $V_{min}$, But it may have to be throttled down in the case of a thermal trip event, such as when the junction temperature exceeds its maximum permitted value.

As indicated by the vertical arrow, when energy consumption exceeds the DC power budget, a change is needed to restore the excess power consumption. For example throttling may be triggered by long term negative energy margin. The margin between the DC power budget and the average energy consumption to allow a reasonable duty cycle is indicated by double arrows.

Figure 5:
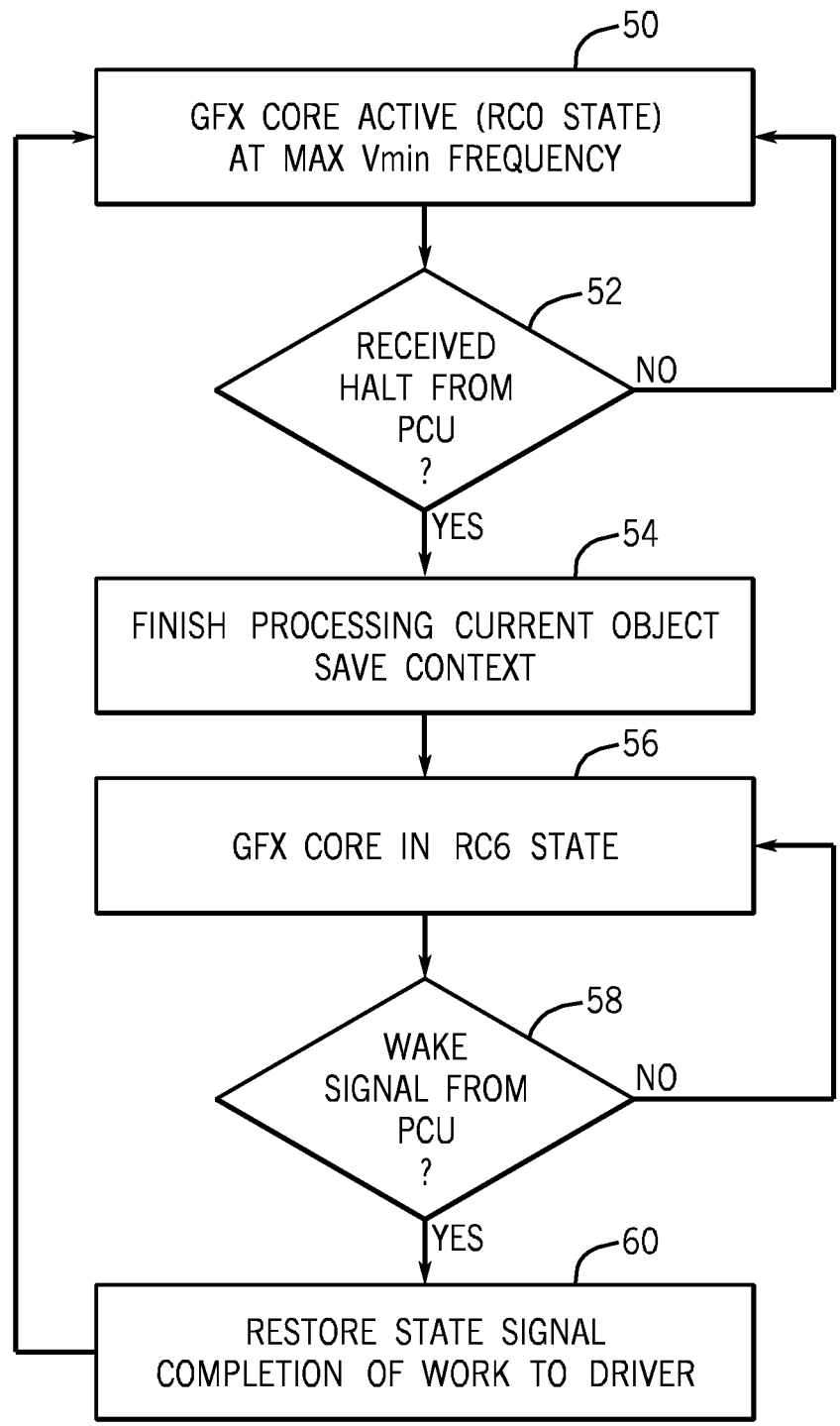
FIG. 5 is a flow chart for one embodiment of the present invention.

Referring to FIG. 5, a flow chart illustrates one mode of operation. In some embodiments, the flow chart may be implemented in hardware, software, and/or firmware. In software embodiments, the flow chart may be executed using instructions stored in a non-transitory computer readable medium, such as an optical, magnetic, or semiconductor memory. In one embodiment, the sequence may be stored in a memory included as part of the power control unit.

Initially, at block 50, the graphics core is active, meaning that it is in the RC0 or C0 power consumption state at the maximum $V_{min}$ frequency in one embodiment. See Advanced Configuration and Power Interface specification 4.0a (Apr. 15, 2010). A check at diamond 52 determines whether a halt has been received from the power control unit. If so, the current object processing is finished and the context is saved, as indicated at block 54. Then the core goes into the power down or C6 power consumption state, as indicated in block 56.

A check at diamond 58 determines whether there is a wake signal from the power control unit. When the signal is received, the state is restored and completion of the work is signaled to the driver, as indicated in block 60. In some embodiments, a duty cycle graphics operation manifests itself in the form of periodic power dissipation patterns on the graphics rail (FIG. 1). The period, in some embodiments, may range between a few milliseconds and a few tens of milliseconds.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    operating a processor at a first frequency level for a first time interval;
    automatically transitioning the processor to a sleep state from said first frequency level after said first time interval;
    automatically transitioning the processor from the sleep state to said first frequency level after a second time interval; and
    completing execution of pending tasks before powering down to said sleep state and reporting completion of said tasks after powering down.

2. The method of claim 1 wherein the first and second time intervals are of different durations.

3. The method of claim 1 wherein said first frequency level is the maximum frequency of operation of the processor at the minimum functional voltage.

4. The method of claim 1 including repeatedly cycling said processor from said sleep state to said first frequency level.

5. The method of claim 4 including operating the processor at the first frequency level while consuming power at the same level as would have been consumed at a lower frequency level without cycling.

6. The method of claim 1 including varying the frequency of operation over time.

7. The method of claim 1 including operating said processor with a duty cycle whose active period duration is set to achieve a power consumption target.

8. The method of claim 1 including forcing said processor into the sleep state at regular timed intervals.

9. The method of claim 1 including saving context to a cache before powering down to said sleep state.

10. A non-transitory computer readable medium storing instructions that enable a processor to:
    operate at a first frequency level for a first time interval;
    transition to a sleep state from said first frequency level after said first time interval;
    transition from the sleep state to said first frequency level after a second time interval; and
    complete execution of pending tasks before powering down to said sleep state and report completion of said task after powering down.

11. The medium of claim 10 further storing instructions to make the first and second time intervals of different durations.

12. The medium of claim 10 further storing instructions such that the first frequency level is the maximum frequency of operation of the processor at the minimum functional voltage.

13. The medium of claim 10 further storing instructions to repeatedly cycle from said sleep state to said first frequency level.

14. The medium of claim 13 further storing instructions to operate at the first frequency level while consuming power at the same level as would have been consumed at a lower frequency level without cycling.

15. The medium of claim 10 further storing instructions to vary the frequency of operation over time.

16. The medium of claim 10 further storing instructions to operate with a duty cycle whose active period duration is set to achieve a power consumption target.

17. The medium of claim 10 further storing instructions to force said processor into the sleep state at regular time intervals.

18. The medium of claim 10 further storing instructions to save context to a cache before powering down to said sleep state.

19. An apparatus comprising:
    a processing core programmed to operate at a first frequency level for a first period of time, automatically transition to a sleep state from said first frequency level after said first time interval, automatically transition from the sleep state to said first frequency level after a second time interval; complete execution of pending tasks before powering down to said sleep state and report completion of said task after powering down; and
    a memory coupled to said core.

20. The apparatus of claim 19 wherein said first and second time intervals are of different duration.

21. The apparatus of claim 19 wherein said first frequency level is the maximum frequency of operation of the processor at the minimum functional voltage.

22. The apparatus of claim 19, said core to repeatedly cycle from said sleep state to said first frequency level.

23. The apparatus of claim 22, said core to operate at the first frequency level while consuming power at the same level as would have been consumed at a lower frequency level without duty cycled operation.

24. The apparatus of claim 19 wherein the frequency of operation of said core varies over time.

25. The apparatus of claim 19, said core to operate with a duty cycle whose active period duration is set to achieve a power consumption target.

26. The apparatus of claim 19, said core being forced into a sleep state at regular timed intervals.

* * * * *